(12) United States Patent
Silver et al.

(10) Patent No.: US 10,976,748 B2
(45) Date of Patent: Apr. 13, 2021

(54) DETECTING AND RESPONDING TO SOUNDS FOR AUTONOMOUS VEHICLES

(71) Applicant: Waymo LLC, Mountain View, CA (US)

(72) Inventors: David Harrison Silver, San Carlos, CA (US); Jennifer Taylor, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 234 days.

(21) Appl. No.: 16/108,411

(22) Filed: Aug. 22, 2018

(65) Prior Publication Data

US 2020/0064856 A1 Feb. 27, 2020

(51) Int. Cl.
| | |
|---|---|
| *G05D 1/02* | (2020.01) |
| *G05D 1/00* | (2006.01) |
| *H04R 5/027* | (2006.01) |
| *B60R 11/02* | (2006.01) |
| *B60W 60/00* | (2020.01) |

(52) U.S. Cl.
CPC ........ *G05D 1/0255* (2013.01); *B60R 11/0247* (2013.01); *G05D 1/0088* (2013.01); *H04R 5/027* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,245,232 B1* | 7/2007 | Caouette, Sr. | ....... G08G 1/0965 340/425.5 |
| 8,676,427 B1 | 3/2014 | Ferguson et al. | |
| 9,873,428 B2 | 1/2018 | Banvait et al. | |
| 9,937,922 B2 | 4/2018 | Reiff et al. | |
| 2014/0032032 A1 | 1/2014 | Cullinane | |
| 2014/0128105 A1* | 5/2014 | Su | ......................... H04W 4/029 455/456.3 |

(Continued)

FOREIGN PATENT DOCUMENTS

| | | |
|---|---|---|
| EP | 3318456 A1 | 5/2018 |
| KR | 101814977 B1 | 1/2018 |

OTHER PUBLICATIONS

International Search Report and Written Opinion for Application No. PCTUS2019047463 dated Dec. 4, 2019.

*Primary Examiner* — Redhwan K Mawari
*Assistant Examiner* — Melanie J Patrick
(74) *Attorney, Agent, or Firm* — Botos Churchill IP Law (57) ABSTRACT

The technology relates to detecting and responding to sounds for a vehicle having an autonomous driving mode. In one example, an audible signal corresponding to a sound received at one or more microphones of the vehicle may be received. Sensor data generated by a perception system of the vehicle identifying objects in an environment of the vehicle may be received. A type of sound may be determined by inputting the audible signal into a classifier. A set of additional signals may be determined based on the determined type of sound. The sensor data may be processed in order to identify one or more additional signals of the identified set of additional signals. The vehicle may be controlled in the autonomous driving mode in order to respond to the sound based on the one or more additional signals and the type of sound.

20 Claims, 5 Drawing Sheets

(56) References Cited

U.S. PATENT DOCUMENTS

| | | | |
|---|---|---|---|
| 2016/0155452 A1* | 6/2016 | Sharifi | G10L 25/51 |
| | | | 381/56 |
| 2017/0113684 A1 | 4/2017 | Banvait et al. | |
| 2017/0248955 A1 | 8/2017 | Banvait et al. | |
| 2017/0364776 A1 | 12/2017 | Micks et al. | |
| 2018/0053413 A1 | 2/2018 | Patil et al. | |
| 2018/0070170 A1* | 3/2018 | Nakadai | H04R 3/005 |
| 2018/0074162 A1* | 3/2018 | Jones | G06Q 10/00 |

* cited by examiner

DETECTING AND RESPONDING TO SOUNDS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. In order to do so safely, these vehicles must be able to detect and identify objects in the environment as well as respond to them quickly. Typically, these objects are identified from information that can be perceived by sensors such as LIDAR, radar, or cameras.

In some instances, sound can be a critically important signal to determining how the vehicle should respond to its environment. For instance, railroad crossing bells, train whistles, beeping sounds emanating from reversing trucks, crosswalk chirping sounds, etc. can all provide important contextual cues to human drivers about what may be happening, and in many cases, before a human driver is able to visually perceive the situation. Therefore being able to detect and respond to such processions can be especially important to ensuring a safe and effective autonomous driving.

BRIEF SUMMARY

One aspect of the disclosure provides a method of detecting and responding to sounds for a vehicle having an autonomous driving mode. The method includes receiving an audible signal corresponding to a sound received at one or more microphones of the vehicle; receiving sensor data generated by a perception system of the vehicle identifying objects in an environment of the vehicle, the perception system including one or more sensors; determining a type of sound by inputting the audible signal into a classifier; identifying a set of additional signals based on the determined type of sound; processing the sensor data in order to identify one or more additional signals of the set of additional signals; and controlling the vehicle in the autonomous driving mode in order to respond to the sound based on the one or more additional signals and the type of sound.

In one example, the method also includes in response to inputting the audible signal into the classifier, receiving a likelihood value for the type of sound, and determining that the likelihood value meets a threshold, wherein identifying the one or more additional signals is performed when the likelihood value is determined to meet the threshold. In this example, the method also includes increasing the likelihood value based on the identified one or more additional signals, and wherein controlling the vehicle is further based on the increased likelihood value. In addition, the method also includes, determining that the increased likelihood value meets a second threshold likelihood value, and wherein controlling the vehicle is further based on the determination that the increased likelihood value meets the second threshold likelihood value. In another example, the method also includes determining that the one or more additional signals are a predetermined combination of additional signals, and wherein controlling the vehicle is further based on the determination that the one or more additional signals are a predetermined combination of additional signals. In another example, the method also includes training the classifier using examples of sounds relevant to driving decisions. In this example, sounds relevant to driving include sounds which would likely cause a change in behavior of the vehicle. In another example, the type of sound is a train whistle and the one or more additional signals includes one or more of a flashing light, a gate, a train, a train station identified in pre-stored map information of the vehicle within a predetermined distance of a current location of the vehicle, or a railroad crossing identified in pre-stored map information of the vehicle within a predetermined distance of a current location of the vehicle. In another example, the type of sound is a reverse beeping sound, and the one or more additional signals includes one or more of a vehicle of a given size or flashing lights. In another example, the type of sound is a crosswalk chirp, and the one or more additional signals includes one or more of a crosswalk, a walk sign, or flashing lights. In another example, the method also includes prior to identifying the one or more additional signals, controlling the vehicle in the autonomous driving mode in order to perform an initial response based the type of sound.

Another aspect of the disclosure provides a system for detecting and responding to sounds for a vehicle having an autonomous driving mode. The system includes one or more processors configured to receive an audible signal corresponding to a sound received at one or more microphones of the vehicle; receive sensor data generated by a perception system of the vehicle identifying objects in an environment of the vehicle, the perception system including one or more sensors; determine a type of sound by inputting the audible signal into a classifier; identify a set of additional signals based on the determined type of sound; process the sensor data in order to identify one or more additional signals of the set of additional signals; and control the vehicle in the autonomous driving mode in order to respond to the sound based on the one or more additional signals and the type of sound.

In one example, the one or more processors are further configured to in response to inputting the audible signal into the classifier, receive a likelihood value for the type of sound and determine that the likelihood value meets a threshold, wherein identifying the one or more additional signals is performed when the likelihood value is determined to meet the threshold. In this example, the one or more processors are further configured to increase the likelihood value based on the identified one or more additional signals, and to control the vehicle is further based on the increased likelihood value. In addition, the one or more processors are further configured to determine that the increased likelihood value meets a second threshold likelihood value, and to control the vehicle is further based on the determination that the increased likelihood value meets the second threshold likelihood value. In addition or alternatively, the one or more processors are further configured to determine that the one or more additional signals are a predetermined combination of additional signals, and wherein controlling the vehicle is further based on the determination that the one or more additional signals are a predetermined combination of additional signals. In another example, the type of sound is a railroad warning bell and the one or more additional signals includes one or more of a flashing light, a gate, a train, a train station identified in pre-stored map information of the vehicle within a predetermined distance of a current location of the vehicle, or a railroad crossing identified in pre-stored map information of the vehicle within a predetermined distance of a current location of the vehicle. In another example, the type of sound is a reverse beeping sound, and the one or more additional signals includes one or more of a vehicle of a given size or flashing lights. In another example, the type of sound is a crosswalk chip, and the one or more additional signals includes one or more of a crosswalk, a walk sign, or flashing lights. In another example, the system also includes the vehicle, the perception system, and the one or more microphones.

DETAILED DESCRIPTION

Overview

The technology relates to detecting and responding to sounds for autonomous vehicles or vehicles operating in an autonomous driving mode. In order to do so, in addition to the perception system which uses lasers, radar, sonar, cameras or other sensors to detect objects in the environment, the autonomous vehicle may be equipped with a series of microphones or microphone arrays arranged at different locations on the vehicle. The perception system may provide the vehicle's computing devices with sensor data including processed and "raw" data from the various sensors.

Once received by the vehicle's computing devices, the output of the microphones may be input into a classifier. In order to train the classifier, examples of sounds relevant to driving decisions may be collected and labeled, for instance by a human operator or otherwise, and used to train the classifier. Once trained, the classifier may be used to identify types of sounds received at the microphones as well as a confidence or likelihood value for each type of sound.

Each type of sound may be associated with a set of additional signals or information. Once a particular type of sound is identified by the classifier at a first likelihood threshold value, the vehicle's computing devices may begin to analyze sensor data from the perception system in order to identify one or more additional signals of the set of additional signals associated with the particular type of sound. By using the first likelihood threshold value, this may avoid the vehicle's computing devices from attempting to search for additional signals which are very unlikely to actually be occurring and which would be a waste of computing resources.

Each additional signal of the identified set of additional signals that is identified may be used to increase the likelihood value that the identified type of sound identified by is in fact a real sound. In addition, these additional signals may be used to identify what object is actually making the sound. Once a second likelihood threshold value is met, the vehicle's computing devices may actively control the vehicle in order to control the vehicle to respond to that sound. The second likelihood threshold value may be greater than the first likelihood threshold value, the identification of at least one additional signal, and/or the identification of a specific or predetermined combination of additional signals. Responding may include responding to an object identified as emanating the sound by controlling the vehicle in an autonomous driving mode in order to yield to that object or simply driving mode cautiously.

The features described herein allow a vehicle driving in an autonomous mode to automatically detect and respond to sounds. Not only does this allow the vehicle to react to situations when objects relevant to such situations are occluded and even before such situations would be "visible" to other sensors such as LIDAR and cameras, but by doing so, it also allows the vehicle more time to respond to such situations. This in turn may make the vehicle significantly safer on the roads.

Example Systems

Figure 1:
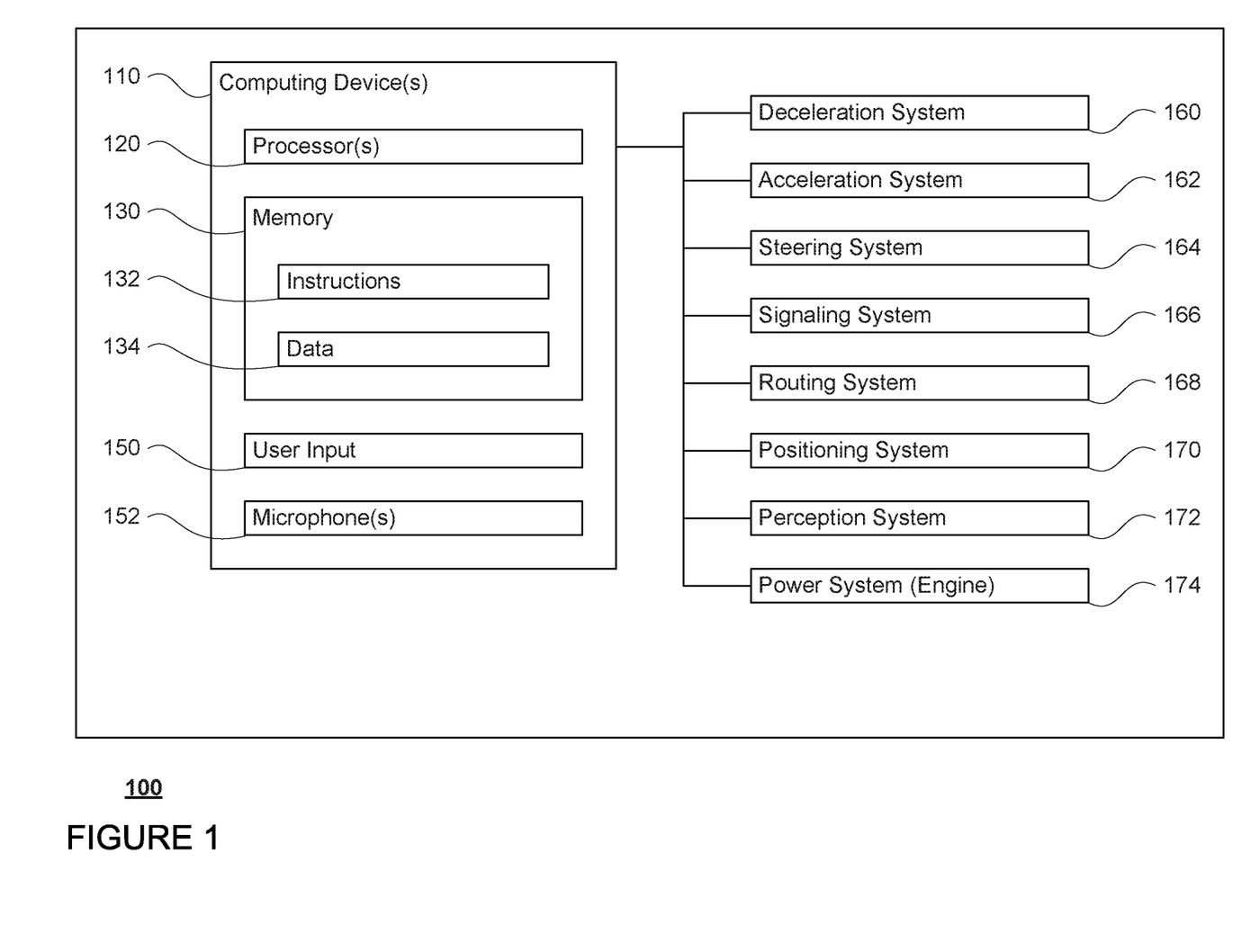
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes a series of microphones 152 or microphone arrays arranged at different locations on the vehicle. As shown, microphone arrays are depicted as separate from the perception system 172 and incorporated into the computing system 110. However all or some of microphones 152 may be incorporated into the perception system 172 or may be configured as a separate system. In this regard, the microphones may be considered independent computing devices operated via is microcontroller which sends signals to the computing devices 110.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 2:
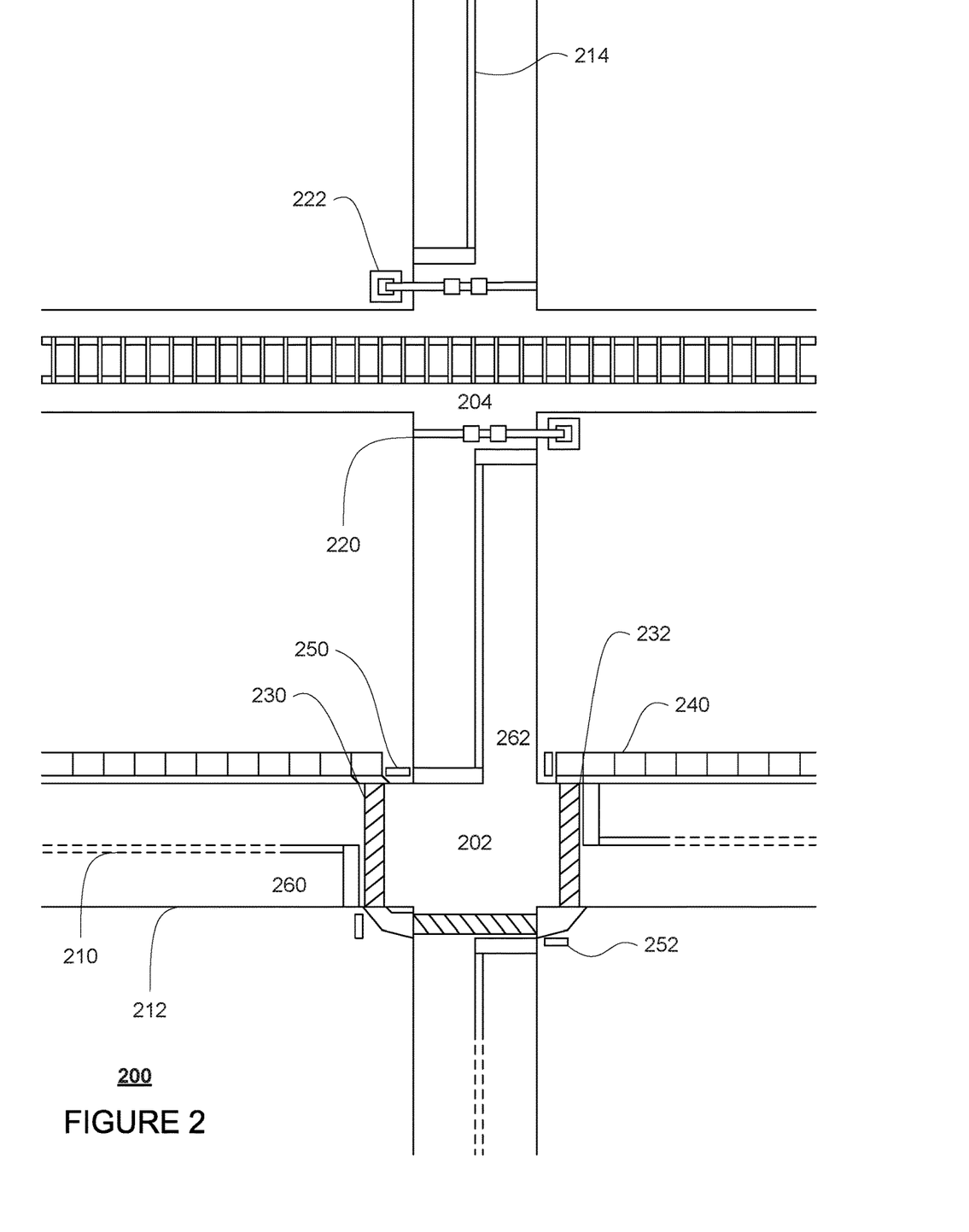
FIG. 2 is an example representation of map information in accordance with aspects of the disclosure.

FIG. 2 is an example of map information 200 for a section of roadway. The map information 200 includes information identifying the shape, location, and other characteristics of various road features proximate to intersection 202 and railroad crossing 204. In this example, the map information 200 information defining the shape and location of lane markers 210-214, railroad crossing gates 220, 222, crosswalks 230, 232, sidewalk 240, stop signs 250,252, as well as the shape and direction of traffic for lanes 260, 262, etc. Although the example of map information 200 includes only a few road features, for instance, lane lines, shoulder areas, an intersection, and lanes and orientations, map information 200 may also identify various other road features such as traffic signal lights, crosswalks, sidewalks, stop signs, yield signs, speed limit signs, road signs, speed bumps, etc. Although not shown, the map information may also include information identifying speed limits and other legal traffic requirements, such as which vehicle has the right of way given the location of stop signs or state of traffic signals, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic light signals, signs, trees, etc. For example, the perception system 172 may include one or more LIDAR sensors, sonar devices, radar units, cameras and/or any other detection devices that record sensor data which may be processed by computing devices 110. The sensors of the perception system may detect objects and their characteristics such as location, orientation, size, shape, type (for instance, vehicle, person or pedestrian, bicyclist, etc.), heading, and speed of movement, etc. The raw data from the sensors and/or the aforementioned characteristics can be quantified or arranged into a descriptive function, vector, and or bounding box and sent as sensor data for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
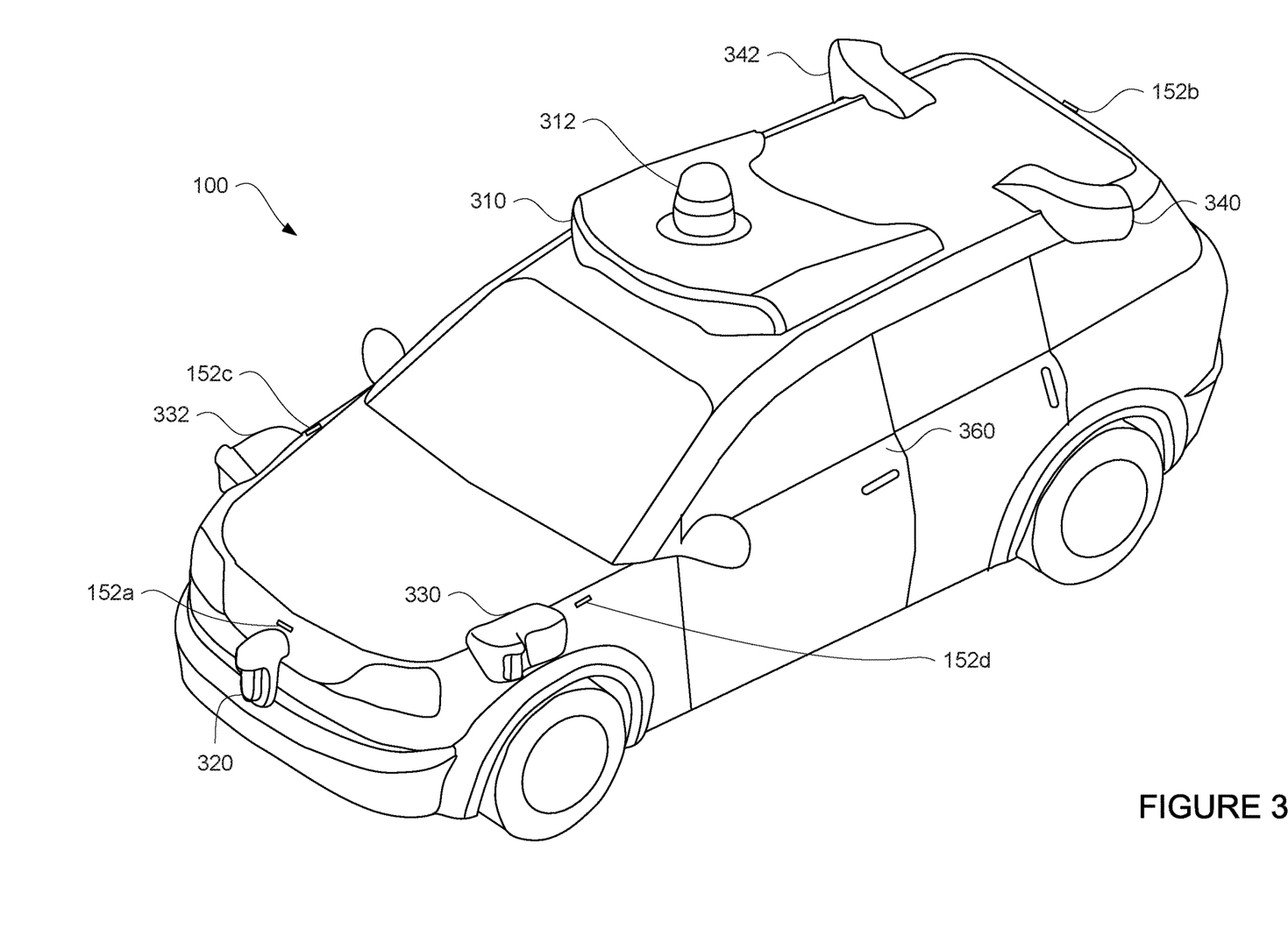
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

FIG. 3 also include microphones 152 (or 152a-152d) arranged at different locations on the vehicle. These microphones may be considered "passive microphones" in that the microphones do not need to include an emitter (such as those used in sonar devices). Each microphone may be a single microphone or part of a larger microphone array. In that regard, as noted above, microphones 152 (including 152a-152d) may actually include one or more microphones or microphone arrays. However, because microphones are directional, in other words an array on the front end of a vehicle does not hear sounds behind the vehicle well, more than one set of microphones or array may be used. In this regard a second set of microphones 152b may be located at the rear of the vehicle 100. Additional microphone arrays, such as microphones 152c and 152d, oriented away from the sides of the vehicle (left and right or "driver" and "passenger" sides of vehicle 100) may also be used.

Although not shown in the FIGURES, in addition or alternatively, microphone arrays may be placed microphones around a roof panel of a vehicle, such as around the circumference of the housing 312 (depicted here as a dome). This may achieve both goals (arrays of closely spaced microphones oriented towards different directions relative to the vehicle) simultaneously, but the microphone arrays would have to be placed in order to limit occlusion of sensors within the dome.

The memory 130 may store various software modules and models. These models include learned models, for instance, those that utilize machine learning, such as classifiers. At first of these models may include a classifier. The classifier, once trained, may be used to identify types of sounds received at the microphones as well as a confidence or likelihood value for each type of sound being a real sound. In order to train the classifier, examples of sounds relevant to driving decisions may be collected and labeled, for instance by a human operator or otherwise, and used to train the classifier. For instance, sounds relevant to driving may include those which would likely cause a change in behavior of the vehicle (i.e. stopping, yielding, driving more slowly, etc.). Example types of such sounds may include train whistles, train bells, railroad warning whistles, railroad warning bells, other sounds related to trains, reverse beeping sounds for trucks, crosswalk chips, vehicle honking noises, vehicle engine revving noises, tire screeching noises, crowd noises, etc. These sounds need not, but may, include honking and/or emergency sirens. The length of the examples used to train the model may be fairly short, for instance at least as long as the labeled sound or even longer for more persistent sounds.

The memory 130 may also store associations. Each type of sound may be associated with a set of additional signals or information. For instance, a type of sound corresponding to a railroad crossing bell, a train whistle, or other sounds related to trains may be associated with a set of additional signals including as flashing lights, a gate, a train, a nearby train station or railroad crossing in the vehicle's pre-stored map information, etc. As another example, a type of sound corresponding to a reverse beeping sound may be associated with a set of additional signals including a large vehicle (i.e. a truck or bus), flashing lights, etc. As another example, a type of sound corresponding to a crosswalk chirp may be associated with a set of additional signals including nearby pedestrians, a crosswalk, a walk sign, flashing or other lights, etc. As another example, a type of sound corresponding to crowd noises may be associated with a set of additional signals including a large group of people. As another example, a type of sound corresponding to tires screeching or a motorcycle engine revving may be associated with a set of additional signals including a motorcycle. These associations may be stored in any number of ways including, for instance, a table, a database, etc.

The memory 130 may also include a second model that can be used to estimate a bearing of a siren noise. For instance, the timing of the siren noise reaching each of the microphones may be measured to provide measurements as to a likely bearing, or relative direction, of the source of the siren, or rather a probability distribution over possible bearings.

The memory 130 may also include a third model. This third model may use the microphone output, previously determined to include siren noise by the first model, as well as timing and amplitudes of the siren noise as input. With regard to the amplitudes, the presence and intensity of higher-frequency harmonics of a siren may also provide some indication of range, since the frequencies drop off at different rates. In some examples, the model may also use the estimated bearing and estimated range as input. In this regard, the third model may include a model which uses all or some the aforementioned inputs to provide a probability distribution over possible ranges (distances) of the source of the siren.

The memory 130 may also include a fourth model. This fourth model may use the siren noise and timing collected over time to estimate a probability distribution over possible relative velocities of the source of the siren noise. For instance, using the change in bearing over time may provide an estimate of the relative velocity. In addition or alternatively, the model may include a neural net trained to predict likelihood over relative velocities from a snippet of the siren sound. This snipped may be any amount of time, such as 0.5 second, 1.0 second, 2.0 seconds, 3.0 seconds, 4.0 seconds or more or less. The net may be able to extract relative velocity from the change in amplitude as well as changes in the harmonics, and in some cases, from Doppler shifts of the siren frequencies.

The examples described herein utilize separate models, however, the models may be implemented as a single classifier to detect a type of sound, estimate a bearing, estimate a range, and estimate a relative velocity. In addition, one or more of the models described above may include learned models, for instance, those that utilize machine learning, such as classifiers, one or more neural nets, or trackers, such as a Kalman filter or those that take in estimated bearings and estimated ranges, and/or corresponding probability distributions, over time, and output other state estimates, such as estimated relative velocities. In still other examples, estimated bearings may be determined using various algorithms such as a generalized cross correlation phase transform. In another example, estimated range may be computed analytically from the amplitude of the pressure sensed by the microphones because using the knowledge a range of siren volumes at a fixed distance and that pressure falls off at a rate of 1/range.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
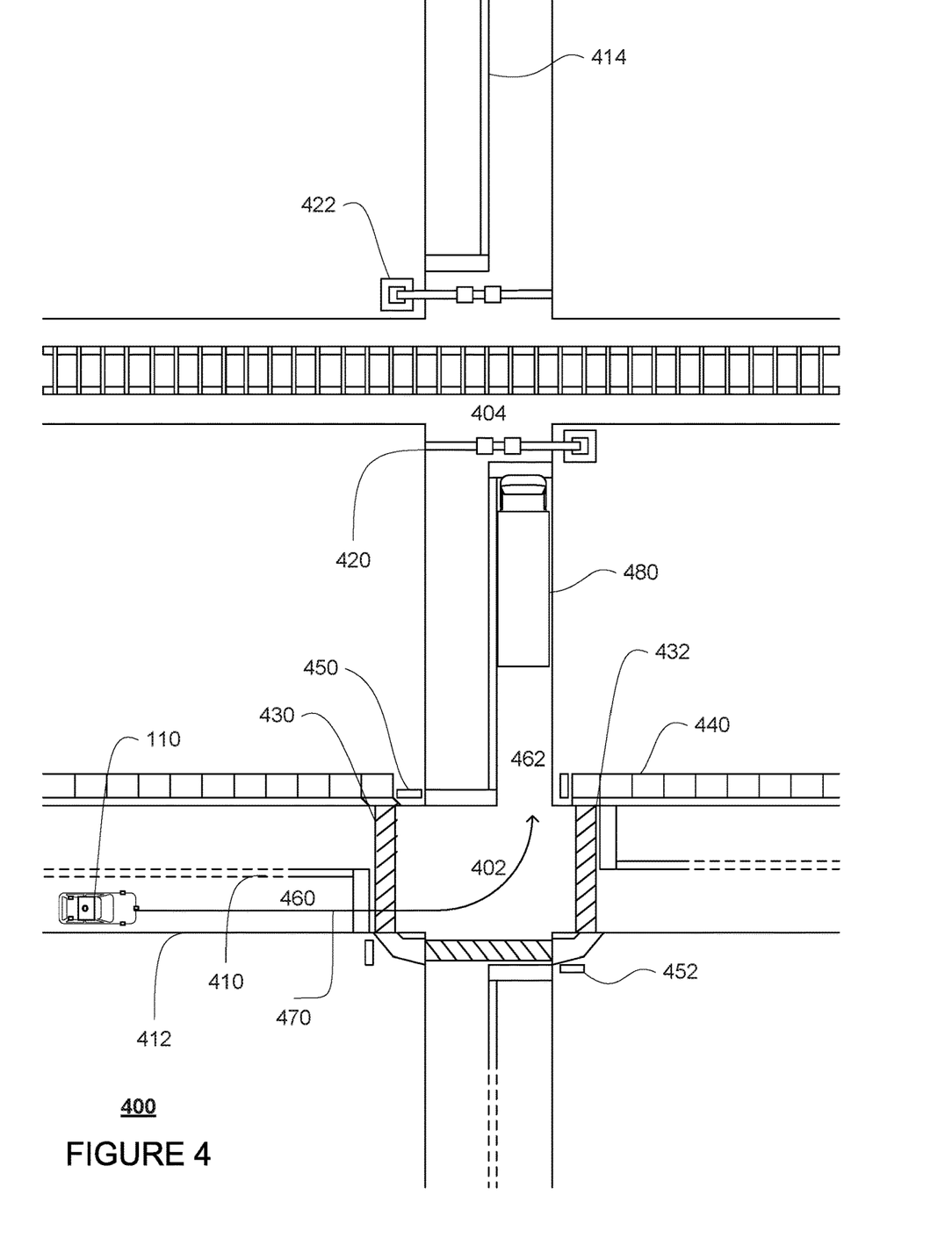
FIG. 4 is an example view of a section of roadway corresponding to the map information of FIG. 2 in accordance with aspects of the disclosure.

As noted above, computing devices 110 may control the movement of vehicle 100 though its environment. FIG. 4 is an example of vehicle 100 maneuvering on a portion of roadway 400 corresponding to the area of map information 200. In this regard, intersection 402 corresponds to intersection 202, railroad crossing 404 corresponds to railroad crossing 204, lane markers 410-414 correspond to lane markers 210-214, railroad crossing gates 420, 422 correspond to railroad crossing gates 220, 222, crosswalks 430, 432 correspond to crosswalks 230, 232, sidewalk 440 corresponds to sidewalk 240, stop signs 450, 452 correspond to stop signs 250,252, lanes 460, 462, correspond to lanes 260, 262, etc. Thus, in this example, vehicle 100 is approaching intersection 402 from lane 460 following a trajectory 470 that will take vehicle 100 into intersection 402 to proceed towards lane 462 by making a left turn at intersection 402.

In this example, the vehicle's perception system 172 may provide the computing devices 110 with information about the vehicle's environment. The perception system 172 may provide the vehicle's computing devices 110 with sensor data including processed and "raw" data from the various sensors. Thus, the sensor data may include the location of objects such as lane markers 410, railroad gate 420, crosswalks 430, 432, stop signs 450, 452, and so on, as well as other road users such as vehicle 480. The characteristics of these different objects, including their shape, location, heading, velocity, etc. may be provided by the perception system 172 to the computing devices 110.

Once received by the vehicle's computing devices 110, the output of the microphones may be input into the aforementioned classifier of memory 130. In some instances, all raw audio signals from the microphones of the vehicle may be input into the classifier. The length of the audio signals analyzed may be very short or very long. Of course, different types of sounds may be best served by different input lengths, so the length could be optimized across all types of sounds that the classifier is able to identify or a different input length for each class (if asking in a binary fashion if a sound is present). As indicated above, the output of the classifier may identify types of sounds received at the microphones as well as a confidence or likelihood value for each identified type of sound.

The likelihood values of the identified types of sounds may be compared to a first threshold likelihood value. If the first threshold likelihood value is met by a given identified type of sound, the set of additional signals associated with the given identified type of sound may also be identified from the aforementioned associations of the memory 130.

The vehicle's computing devices may then begin to analyze sensor data as well as the map information in order to identify one or more additional signals of the identified set of additional signals. For instance, if the classifier identifies a railroad warning bell at a likelihood value that meets the first threshold likelihood value, the vehicle's computing devices 110 may begin to actively search LIDAR sensor data and/or camera images for a train or flashing lights. For example, the computing devices 110 may use the map information 200 to identify flashing lights of the railroad crossing gate 220/620. This may be accomplished, for instance, using various classifiers and/or image processing techniques. The vehicle's computing devices may also search the map information to identify whether there is a nearby railroad crossing. As an example, the computing devices 110 may use the map information 200 to identify railroad crossing 204.

For another instance, if the classifier identifies a reverse beeping sound at a likelihood value that meets the first threshold likelihood value, the vehicle's computing devices 110 may begin to actively search LIDAR sensor data and/or camera images for a large vehicle. For example, the computing devices 110 may use sensor data received from the perception system 172 in order to identify vehicle 480, corresponding to a large truck. This may be accomplished, for instance, using various classifiers and/or image processing techniques.

For another instance, if the classifier identifies a crosswalk chirp at a likelihood value that meets the first threshold likelihood value, the vehicle's computing devices 110 may begin to actively search LIDAR sensor data and/or camera images for nearby pedestrians. The vehicle's computing devices may also search the map information to identify whether there is a nearby pedestrian, walk sign, flashing or other lights. As an example, the computing devices 110 may use the map information 200 to identify crosswalks 430 and 432.

Each additional signal of the identified set of additional signals that is identified from the sensor data may be used to increase the likelihood value. This, in turn, may indicate that that the particular type of sound identified by the classifier is more likely to be a "real" sound. By using the first threshold, this may avoid the vehicle's computing devices from attempting to search for additional signals which are very unlikely to actually be occurring and which would be a waste of computing resources.

In addition, the sound, map information, as well as any identified additional signals may be used to identify what object is actually making the sound. For instance, the sound and any additional signals may be used as input to the second model in order to provide measurements as to a likely bearing, or relative direction, of the source of the siren, or rather a probability distribution over possible bearings. In addition, the sound, amplitude, and timing may be input into the third model to provide a probability distribution over possible ranges of the source of the siren. The fourth model may be used to estimate a probability distribution over possible velocities of the source of the siren noise. The information from the models may be provided to the one or more computing devices 110 of the vehicle. These computing devices 110 may use the estimated bearing, estimated range, estimated relative velocity and additional signals to identify a specific object in the vehicle's environment which created the sound.

The likelihood values of the identified types of sounds may be compared to a second threshold likelihood value. Once the second threshold likelihood value is met by a given identified type of sound, the vehicle's computing devices may actively control the vehicle in order to respond to that sound depending upon the location of the object that is actually making the sound. The second likelihood threshold value may be greater than the first likelihood threshold value, the identification of at least one additional signal, and/or the identification of a specific combination of additional signals.

The computing devices 110 may respond by controlling the vehicle 100 in an autonomous driving mode in order to react to the sound. For instance, responding may include responding to an object identified as emanating the sound by yielding to that object or simply driving mode cautiously. The actual behavior of the vehicle may be defined by the constraints of the vehicle's software and the various other objects in the vehicle's environment. In addition, the observed movements of the object creating the sound, as determined from the sensor data, if any, may also be considered when determining how best to respond to the object thereby further improving the usefulness of the response. Of course, if the object making the sound is behind the vehicle and not approaching the vehicle, the vehicle's computing devices may simply ignore the sound (i.e. the object has already been passed by and is not relevant to driving decisions).

In some examples, the computing devices 110 may begin to cause the vehicle 100 react to the sound as soon as the first threshold likelihood value is met. At the same time, the computing devices may continue to attempt to identify additional signals as discussed above. For instance, if a sound is identified as a train whistle by the classifier to a likelihood value that meets the first threshold, the vehicle's computing devices may automatically slow the vehicle down as an initial response or initial safety measure. As another instance, if a sound is identified as a reverse beeping sound by the classifier to a likelihood value that meets the first threshold, the vehicle's computing devices may automatically yield to all larger vehicles as an initial response. The vehicle's reaction will be "stronger" or more confident the greater the likelihood value. Once additional signals are identified, these may be used to determine whether to ignore the sound or to continue to respond to the sound.

Figure 5:
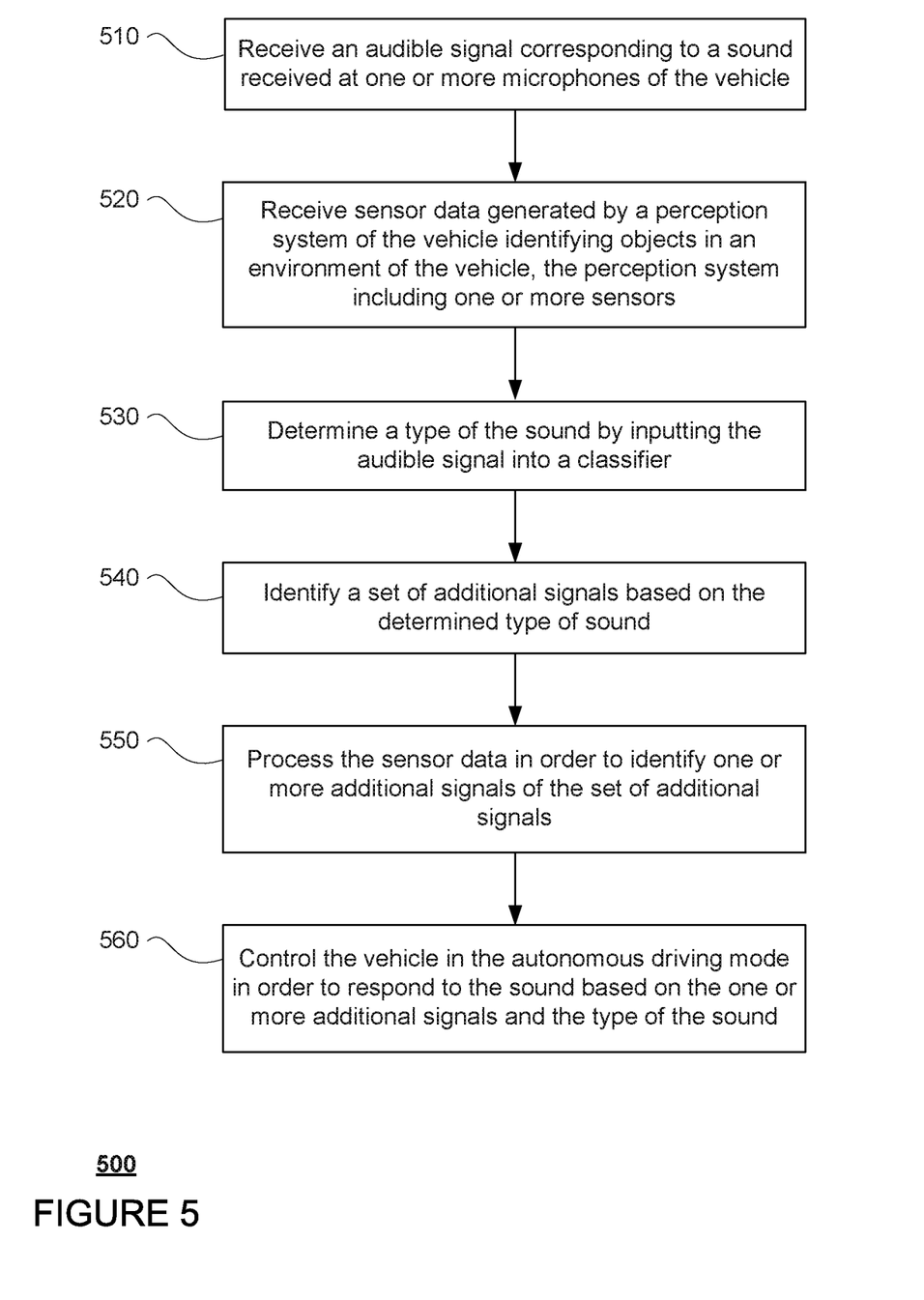
FIG. 5 is a flow diagram in accordance with aspects of the disclosure.

FIG. 5 is a flow diagram 500 that may be performed by one or more processors such as one or more processors 120 of computing devices 110 in order to detect and respond to sounds for a vehicle having an autonomous driving mode. At block 510, an audible signal corresponding to a sound received at one or more microphones of the vehicle is received. At block 520, sensor data generated by a perception system of the vehicle identifying objects in an environment of the vehicle is received. The perception system includes one or more sensors. At block 530, a type of sound is determined by inputting the audible signal into a classifier. At block 540, a set of additional signals is identified based on the determined type of sound. At block 550, the sensor data is processed in order to identify one or more additional signals of the set of additional signals. At block 560, the vehicle is controlled in the autonomous driving mode in order to respond to the sound based on the one or more additional signals and the type of sound.

The features described herein allow a vehicle driving in an autonomous mode to automatically detect and respond to sounds. Not only does this allow the vehicle to react to situations when objects relevant to such situations are occluded and even before such situations would be "visible" to other sensors such as LIDAR and cameras, but by doing so, it also allow the vehicle more time to respond to such situations. This in turn may make the vehicle significantly safer on the roads.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of detecting and responding to sounds for a vehicle having an autonomous driving mode, the method comprising:
   receiving, by one or more processors, an audible signal corresponding to a sound received at one or more microphones of the vehicle;
   receiving, by the one or more processors, sensor data generated by a perception system of the vehicle identifying objects in an environment of the vehicle, the perception system including one or more sensors;
   inputting, by the one or more processors, the audible signal into a classifier;
   determining, by the classifier, a type of sound associated with the inputted audible signal;
   outputting, by the classifier, a likelihood value for the determined type of sound;
   controlling, by the one or more processors, the vehicle in the autonomous driving mode in order to initially respond to the sound based on the determined type of sound;
   determining, by the one or more processors, whether the likelihood value meets a first threshold;
   when the likelihood value is determined to meet the first threshold:
      identifying, by the one or more processors, a set of additional signals based on the determined type of sound;
      processing, by the one or more processors, the sensor data in order to identify one or more additional signals of the set of additional signals;

adjusting, by the one or more processors, the likelihood value based on the identified one or more additional signals; and determining, by the one or more processors, whether the adjusted likelihood value meets a second threshold; and when the likelihood value is determined to meet the second threshold:

controlling, by the one or more processors, the vehicle in the autonomous driving mode in order to continue to respond to the sound based on the identified one or more additional signals and the determined type of sound.

2. The method of claim 1, wherein the likelihood value is increased based on the identified one or more additional signals.

3. The method of claim 2, wherein the second threshold is greater than the first threshold.

4. The method of claim 1, further comprising, determining that the one or more additional signals are a predetermined combination of additional signals, and wherein controlling the vehicle is further based on the determination that the one or more additional signals are the predetermined combination of additional signals.

5. The method of claim 1, further comprising training the classifier using examples of sounds relevant to driving decisions.

6. The method of claim 5, wherein sounds relevant to driving include sounds which would likely cause a change in behavior of the vehicle.

7. The method of claim 1, wherein the determined type of sound is a train whistle and the one or more additional signals includes one or more of a flashing light, a gate, a train, a train station identified in pre-stored map information of the vehicle within a predetermined distance of a current location of the vehicle, or a railroad crossing identified in pre-stored map information of the vehicle within a predetermined distance of a current location of the vehicle.

8. The method of claim 1, wherein the determined type of sound is a reverse beeping sound, and the one or more additional signals includes one or more of a vehicle of a given size or flashing lights.

9. The method of claim 1, wherein the determined type of sound is a crosswalk chirp, and the one or more additional signals includes one or more of a crosswalk, a walk sign, or flashing lights.

10. The method of claim 1, further comprising, prior to identifying the one or more additional signals, controlling the vehicle in the autonomous driving mode in order to perform an initial response based the determined type of sound.

11. The method of claim 1, wherein the classifier is stored by a memory.

12. A system for detecting and responding to sounds for a vehicle having an autonomous driving mode, the system comprising:

one or more processors configured to:

receive an audible signal corresponding to a sound received at one or more microphones of the vehicle;

receive sensor data generated by a perception system of the vehicle identifying objects in an environment of the vehicle, the perception system including one or more sensors;

input the audible signal into a classifier;

determine a type of sound associated with the inputted audible signal;

output from the classifier a likelihood value for the determined type of sound;

control the vehicle in the autonomous driving mode in order to initially respond to the sound based on the determined type of sound; and determine whether the likelihood value meets a first threshold;

when the likelihood value is determined to meet the first threshold:

identify a set of additional signals based on the determined type of sound;

process the sensor data in order to identify one or more additional signals of the set of additional signals;

adjust the likelihood value based on the identified one or more additional signals; and determine whether the adjusted likelihood value meets a second threshold; and when the likelihood value is determined to meet the second threshold:

control the vehicle in the autonomous driving mode in order to continue to respond to the sound based on the identified one or more additional signals and the determined type of sound.

13. The system of claim 12, wherein the likelihood value is increased based on the identified one or more additional signals.

14. The system of claim 13, wherein the second threshold is greater than the first threshold.

15. The system of claim 12, wherein the one or more processors are further configured to determine that the one or more additional signals are a predetermined combination of additional signals, and wherein controlling the vehicle is further based on the determination that the one or more additional signals are the predetermined combination of additional signals.

16. The system of claim 12, wherein the determined type of sound is a railroad warning bell and the one or more additional signals includes one or more of a flashing light, a gate, a train, a train station identified in pre-stored map information of the vehicle within a predetermined distance of a current location of the vehicle, or a railroad crossing identified in pre-stored map information of the vehicle within a predetermined distance of a current location of the vehicle.

17. The system of claim 12, wherein the determined type of sound is a reverse beeping sound, and the one or more additional signals includes one or more of a vehicle of a given size or flashing lights.

18. The system of claim 12, wherein the determined type of sound is a crosswalk chirp, and the one or more additional signals includes one or more of a crosswalk, a walk sign, or flashing lights.

19. The system of claim 12, further comprising the vehicle, the perception system, and the one or more microphones.

20. The system of claim 12, wherein the classifier is stored by a memory.

* * * * *